United States Patent

Pham et al.

[11] Patent Number: 6,134,225
[45] Date of Patent: Oct. 17, 2000

[54] DEVICE FOR BROADCASTING DIGITAL INFORMATION VIA SATELLITE

[75] Inventors: Huu Nghia Pham, Saint-Cyr l'école, France; Carlo Elia, Oegstgeest, Netherlands

[73] Assignees: Organisation Europeenne de Telecommunications par Satellite Eutelsat; Agence Spatiale Europeenne, both of Paris, France

[21] Appl. No.: 08/932,242

[22] Filed: Sep. 17, 1997

[30] Foreign Application Priority Data

Sep. 19, 1996 [FR] France .................................. 96 11431

[51] Int. Cl.[7] .................................................. H04B 7/185
[52] U.S. Cl. .......................... 370/316; 370/326; 455/3.2; 455/12.1
[58] Field of Search .................................. 455/427, 12.1, 455/3.1, 98, 3.2; 370/312, 345; 348/461; 380/48; 375/206, 208

[56] References Cited

U.S. PATENT DOCUMENTS

| 4,145,573 | 3/1979 | Arnold . | |
|---|---|---|---|
| 4,425,639 | 1/1984 | Acampora et al. . | |
| 5,506,903 | 4/1996 | Yamashita ................................... | 380/19 |
| 5,712,850 | 1/1998 | Elia et al. ................................. | 370/326 |
| 5,721,778 | 2/1998 | Kubota et al. ............................. | 380/10 |
| 5,838,668 | 11/1998 | Okada et al. ............................. | 370/312 |

FOREIGN PATENT DOCUMENTS 0 695 051  1/1996  European Pat. Off. .

OTHER PUBLICATIONS

SMPTE Journal, vol. 103, No. 11, Nov. 01, 1994, US, pp. 741–747, XP000475180.
Reimers, U., "Concept of a European System for the Transmission of Digitized Television Signals via Satellite".

*Primary Examiner*—Dwayne D. Bost
*Assistant Examiner*—Erika A. Gray
*Attorney, Agent, or Firm*—Browdy and Neimark

[57] ABSTRACT

The device comprises at least one set of links that send packet formatted digital information to the satellite on at least two different frequencies, at least one second set of links on board the satellite receives the digital information packets, at least one packet time multiplexing module connected both to output of the second set of links and to input of a digital information formatting module comprising a scrambler connected to input of a part of a broadcasting DVB-S chain beginning by a convolutive interleaving block and terminating by a QPSK modulator, at least one clock on board the satellite, this clock, working in asynchronism with all earth clocks and driving the satellite-borne assembly.

11 Claims, 2 Drawing Sheets

DEVICE FOR BROADCASTING DIGITAL
INFORMATION VIA SATELLITE

FIELD OF THE INVENTION

The present invention relates to digital transmission of information and more particularly to the transmission via satellite of earth station broadcastings having then to be re-transmitted to various receivers.

BACKGROUND OF THE INVENTION

The invention concerns more particularly any digital transmission via satellite to earth receivers, more particularly home receivers, which are designed to receive a signal according to ETS 300 421 standard (a digital television broadcasting via satellite in the Ku bands, called DVB-S developed by the DVB, Digital Video Broadcasting group).

This invention is particularly useful when it is necessary to dispatch digital flows of small flow rates (about 6 Mbits/sec. or less) from a plurality of distance sources, belonging to independent entities, towards a multiplexing point in order to form therein the final broadcasting multiplex according to the ISO/IEV 13818-1 standard (system part of the MPEG2 developed by the MPEG Moving Picture Expert Group) while avoiding an architecture involving a terrestrial centralized transit point. Actually, the invention is supported on a construction which makes possible establishing, on board a satellite, the final broadcasting multiplex that contains the elementary flow information from distance sources, these distance sources being fitted with earth stations of small size emitting to the satellite.

The invention is also useful in the simplicity of the earth equipments for conveying the elementary digital flows, while ensuring the compability with the DVB earth receivers in service that are currently spread over at a large scale, in particular the home receivers which, for economical reason do not have a receiving flow rate range that is sufficiently wide for enabling them to both receive high flow rate signals (about 40 Mbits/sec.) and low flow rate signals (about 6 Mbits/sec. or less), and the home receivers having not an antenna that is sufficiently great for enabling them to pick up signals transmitted via satellite separately in a frequency share mode in a same satellite repetiter because of the power retiring of the progressive wave amplifier that is necessary for avoiding non-linearity bad effects.

SHORT DESCRIPTION OF THE KNOWN ART

The known art has already taught methods and systems concerning the hereinabove matter.

A known construction is described in U.S. Pat. No. 4,145,573 to Arnold in which, in a multibeam digital time-division switched satellite communication system, users of differing capacity needs are efficiently served by guantizing the capacity of each of a plurality of earth stations and, similarly the bit repetition rate of each earth station, into integral powers of two. At the satellite, the uplink bitstream transmitted by each earth station is recovered, and the higher rate bit streams are demultiplexed to form plural equal bit rate subchannels at the input to the satellite switch, the number of subchannels formed being equal to the quantized capacity of the associated earth station. After the satellite switch transfers the bits present at the switch inputs from all earth stations to the appropriate switch outputs, a plurality of output subchannels are multiplexed to form the higher bit rate signals, the number of subchannels multiplexed being equal to the quantized capacity of the earth station to which the bits are directed.

Another construction is also known by a European patent application filed under No 95 401 703.4 on Jul. 18, 1995 in the name of Agence Spatiale Europeenne and published under No 0 695 051. The above European patent application relates to a digital broadcasting system via satellite that comprises a link that sends digital information to the satellite, said satellite re-emitting an emission multiplex. According to the prior document, the link comprises a plurality of individual transmitters each of which transmit an emission signal at a first flow rate corresponding at least to a programm, and the satellite comprises a satellite-borne multiplexer module combining said emission signals for forming the emission multiplex at a second flow rate that is higher than the first flow rate.

In the above construction, the energy dispersion scrambling (EDS) of the DVB (Digital Video Broadcasting) digital television standard is made on earth, by means of a modification of the initialization algorithm of the scrambler. This modification enables a plurality of stations that emit uplinks to apply in turn a so-called pseudo random binary sequence (PRBS). The result will appear as if a single PRBS were produced for the scrambling of the total carrying flow on the downlink, which is in agreement with the framing structure of the DVB standard.

The synchronisation information of the scrambler in each emission station must be updated with each modification of the binary flow rate cutting of the downlink such as that resulting from an activation of a new station, from the closing of are existing station or from the change of binary flow rate by an active station.

A synchronisation change protocol of the scrambler must also be defined, preferably without introducing interruptions at each service.

Moreover, a bad working of one or more going-up stations in the appropriate production of the inverted synchronisation bytes of the MPEG-2 standard results in a periodical loss of the inverted synchronisation byte and lowers the synchronisation function of the decoder de-scrambler or integrated reception demodulator (IRD) for all the other services in the multiplex of the going-down path, Since the synchronisation is not standardized in an IRD, it is difficult to estimate what impact that may produce.

In order to get free of the synchronization mechanism of the frames of the energy dispersion scrambler (EDS) DVB-S and therefore of the interdependance between the earth broadcasting stations, a possible improvement of the construction according to the above European patent application would provide a multiplexer of Reed-solomon un-coded MPEG2 packets and to use the integral broadcasting DVB chain such as described in FIG. 1 of the ETS 300 421 standard (DVB-S). According to this possible construction, the chaining of the blocks between the output of the multiplexer and the satellite-borne QPSK modulator would be: the EDS, the Reed-Solomon code (so called: external code), the convolutive interleaver and the convolutive encoder (so-called: internal code) However, this construction would necessitate either use of a DVB Reed-Solomon decoding (204.188.t=8) on board the satellite, which cannot absolutely be done on the current state of satellite-borne technolgy, or rejection of use this external encoding for the uplinks, which will cause an increase of the broadcasting power of the earth stations and will consequently increase their complexity.

OBJECT OF THE INVENTION

The present invention solves this problem by making the scrambling function (EDS) on board the satellite while maintaining the Reed Solomon encoding in the earth broadcasting stations, without necessitating a Reed Solomon decoding step on board.

Because of the features of the invention, the scrambling result (EDS) of the DVB-S is rigorously respected by the action of a modified scrambler (MEDS, Modified Energy Dispersal Scrambler) which is positioned in the satellite transmission chain, at an output of the packet multiplexing module (DVB), and which takes into account the fact that these packets are already encoded by the Reed Solomon code, and not the MPEG2 packets as in the original diagram of the ETS 300 421 standard (DVB-S). The output of this MEDS is directly connected to the convolutive interleaving block.

Further, the structure of the broadcasting stations is simplified, and their operation is independent of the number of active stations that share the same multiplex transmitted by the satellite and independent of their respective flow rates, which is useful in a working where the uplink features may frequently change, such as a working in allocation of pass bands upon request, or yet a sharing of one or more frequencies on the going-up path by a plurality of stations in time division multiple access (TDMA) mode.

SUMMARY OF THE INVENTION

According to the invention, the device for broadcasting digital information via satellite from a plurality of stations comprises:

- at least one set of links that send packet formatted digital information to the satellite, on at least two different frequencies;
- at least one second set of links on board the satellite receive said digital information packets;
- at least one packet time multiplexing module connected, both to output of said second set of links, and to input of a digital information formatting module;
- said digital information formatting module comprising a scrambler connected to input a part of a broadcasting DVB-S chain beginning by a convolutive interleaving block;
- at least one clock on board the satellite, this clock working in asynchronism with all earth clocks and driving the satellite-borne assembly which begins by the packet time multiplexing module;
- the part of the broadcasting DVB-S chain, which begins by the convolutive interleaving block, terminates by a QPSK modulator.

According to other features of the invention:

- the signal transmitted via the satellite by means of the modulator and which is a time multiplex containing all the useful information, individually transmitted to the satellite by a plurality of earth stations, is compatible with receivers designed for receiving DVB-S signals and in particular with home receivers that are currently spread over at a great scale, without modification thereof;
- the earth broadcasting stations, sending their information flow to the multiplexing module, are free of clock mutual synchronisation mechanisms other than a derivation of the broadcasting clocks from a clock extracted from the multiplex signal received on going-down path;
- the earth broadcasting stations comprise a structure including a source driven by an individual clock and connected to an encoding block, itself possibly connected to a scrambling block the output of which is modulated by a modulator, this structure enabling said broadcasting stations to activate and terminate their transmissions or to change of flow rates among values that are offered by the satellite-borne receiving assembly, without any impact on the service of the other stations and without having recourse to a coordinating protocol between the stations, and therefore independently of the number of active stations and of their current flow rates;
- the earth broadcasting stations comprise a Reed Solomon coding block of the DVB standard, without making a Reed Solomon decoding on board of satellite, while ensuring a protection against transmission errors on the going-up paths, the Reed Solomon decoding being made in earth receivers;
- the scrambler is a modified scrambler ensuring on board the satellite, a scrambling of the DVB-S for taking into account the fact that the packets outputting from the multiplexing module are already encoded by the Reed Solomon coding of the DVB standard;
- the modified scrambler applies an exclusive-OR operation between packets of 204 bytes outputting from the multiplexing module and pseudo-random sequences also of 204 bytes;
- said pseudo-random sequences result from a cutting of the initial sequence of the EDS scrambler of the DVB-S in eight sections, the first of which has a length of 187 bytes and the seven others of which have a length of 188 bytes, and by applying simple operations on these sequences;
- the simple operations applied on the sequences provide for cutting the initial sequences of the EDS scrambler of the DVB-S into eight sections, the first of which has a length of 187 bytes and the seven others of which have a length of 188 bytes; a byte OxFF (255 in decimal) is added as header to the first sequence for making a sequence of 188 bytes; the first byte of the seven other sequences are changed of value by bringing it to zero, and the Reed Solomon code of the DVB is applied to the eight sequences of 188 bytes thus obtained, thereby producing 8 pseudo-random sequences.
- the pseudo-random sequences of the modified scrambler are pre-calculated and stored in a read only memory (ROM).

Various other features of the invention will moreover be revealed from the following detailed description.

BRIEF DESCRIPTION OF THE DRAWINGS

An embodiment of the invention is described, as a non limitative example, in the accompanying drawings, wherein.

DETAILED DESCRIPTION OF THE INVENTION

Figure 1:
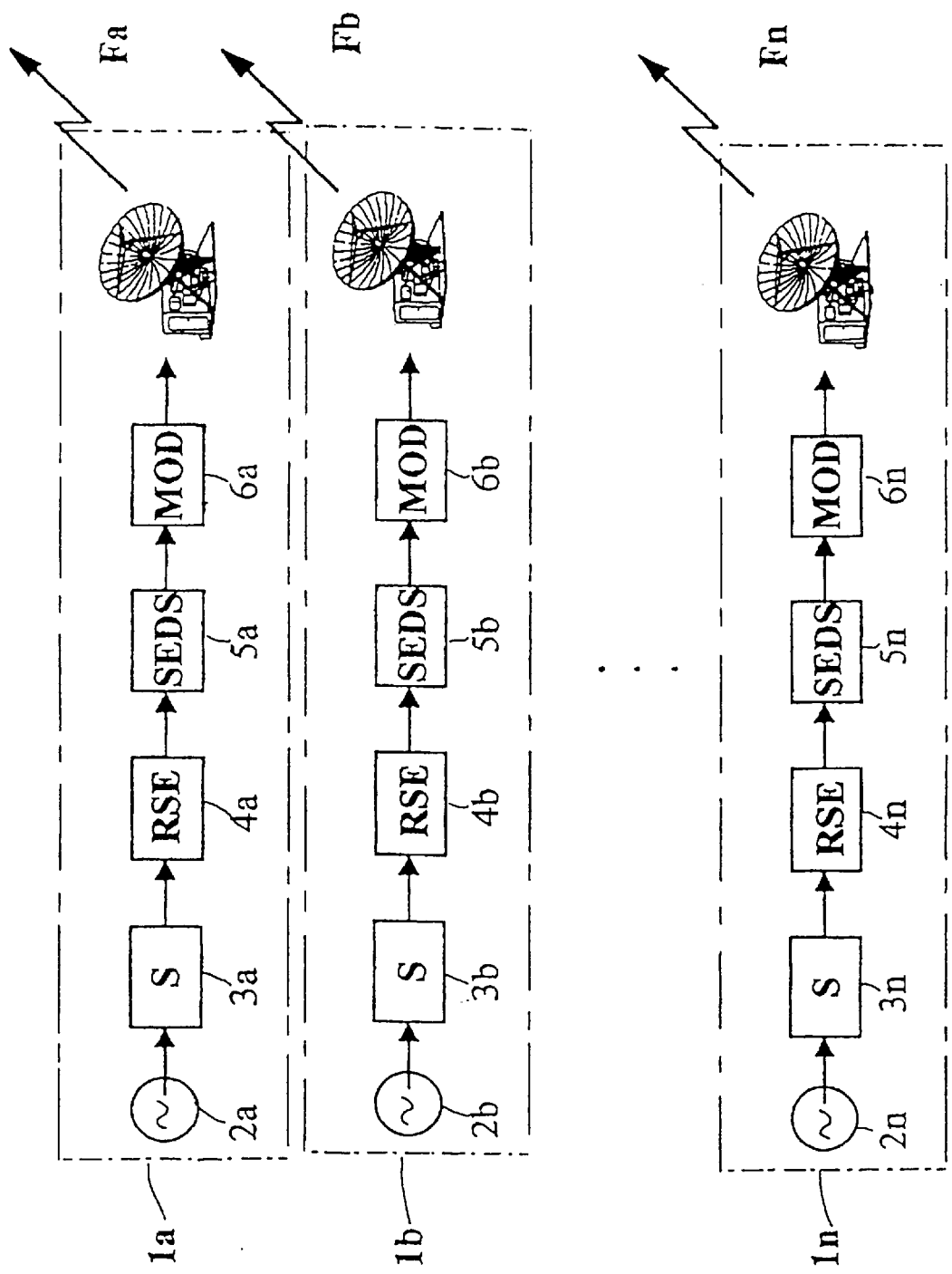
FIG. 1 illustrates the structure of the earth broadcasting stations.

Referring now to the drawings, each broadcasting station 1a, 1b, . . . , 1n comprises a source shown at 3a, 3b, . . . , 3n that generates packets of 188 bytes starting with a syrnchronisation bytes the value of which is fixed and equal to 0x47 (47 in hexadecimal) and by three header bytes, followed with 184 bytes of useful load. Only the choice of the values of the three header bytes must satisfy some rules in order to ensure coherence of the final multiplex according to the ISO-IEC 13818-1 standard, the bytes of the useful load may take any possible values. The space of the values of the header bytes assigned to each source may be given in a statistic manner.

The various sources are driven by individual clocks shown at $2a$, $2b$ ... $2n$, which are not necessarily synchronous clocks, and the common denominator is the clock extracted from the digital signal received on the going-up path (point 17, in FIG. 2).

The packets outputting from the sources S are treated by Reed Solomon encoding RSE blocks $4a$, $4b$, ..., $4n$, these blocks being rigorously in accordance with the DVB standard.

In order to comply with international regulations in force in the Ku bands concerning maximum power density in direction to space, the outputs of the Reed Solomon coding RSE blocks are scrambled by SEDS blocks that form simplified energy dispersion scramblers shown at $5a$, $5b$, ..., $5n$. These blocks are not necessarily required in other frequency bands.

The binary flow, resulting from the scrambling blocks SEDS is modulated, for example in quiadriphase (QPSK) or in any other appropriate binary modulation according to specific needs, either in pass band conservation or in energy conservation, by modulators MOD shown at $6a$, $6b$, ..., $6n$. The transmission central frequencies $Fa$, $Fb$, ..., $Fn$ of the stations are assigned in a static manner in function of the bank of satellite-borne demodulators (FIG. 2).

Figure 2:
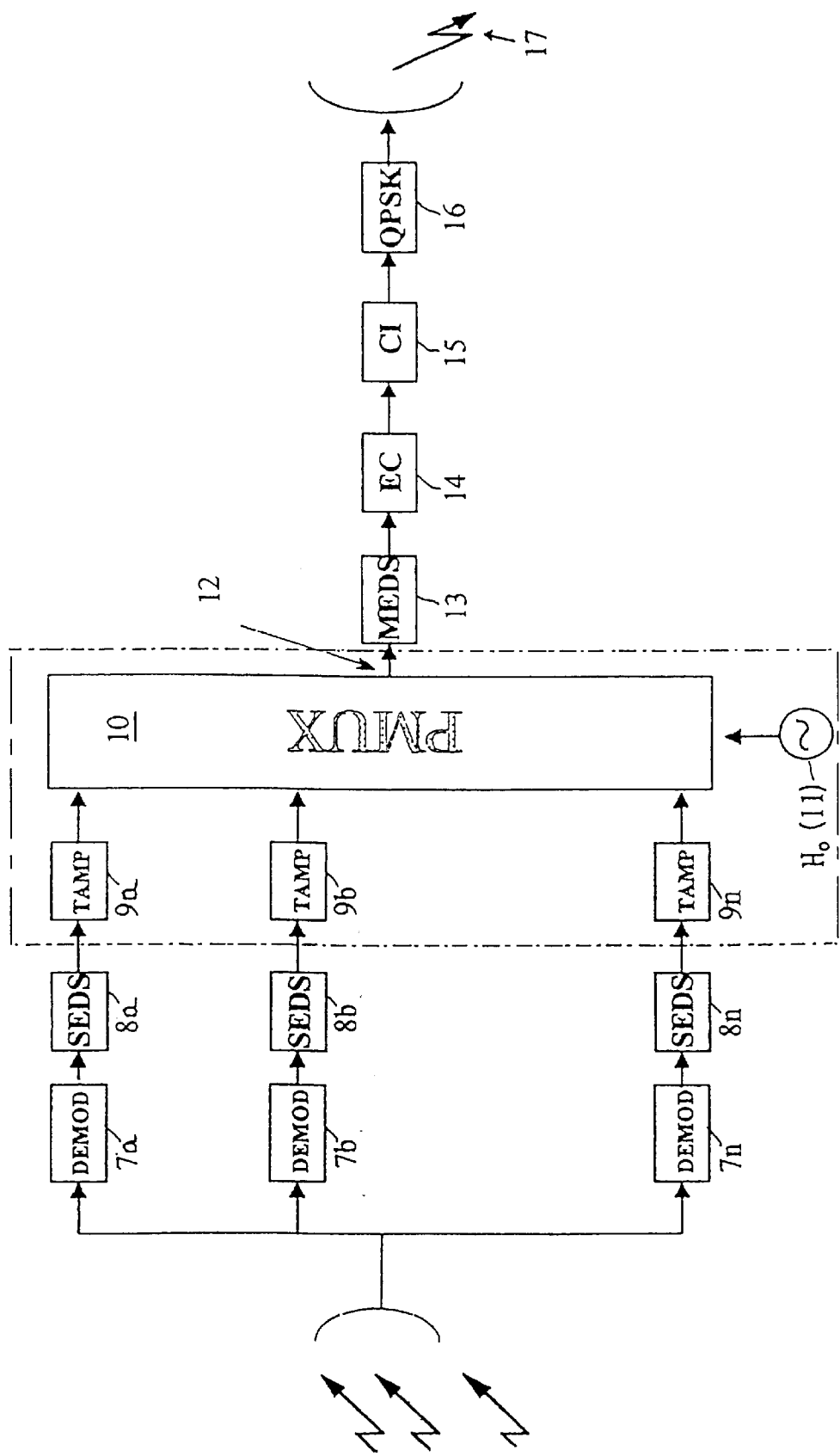
FIG. 2 illustrate the structure on board of satellite.

In FIG. 2, outputs of demodulators DEMOD, shown at $7a$, $7b$, ..., $7n$ and adapted to the modulators MOD of FIG. 1, are respectively connected to SEDS blocks that form simplified energy dispersion de-scramblers shown at $8a$, $8b$, ..., $8n$.

According to the hereinbefore described arrangement, the earth SEDS blocks and the SEDS blocks on board the satellite are identical blocks, made by applying an exclusive-OR function (XOR) of the DVB packets of 204 bytes with a pseudo-random sequence, the length of which is 203 bytes, the MPEG2 synchronisation bytes of the packet being not scrambled, This length is chosen for ensuring a suitable recognition fiability of the MPEG2 synchronisation words (Ox47) in the presence of high binary error rates (BER) able to reach up to $10^{-5}$ for example. The construction of the pseudo-random sequence of the SEDS and SEDS blocks may be obtained by various manners and is not detailed here.

The SEDS blocks $8a$, $8b$, ..., $8n$ are connected to input/output buffers (TAMP) shown at $9a$, $9b$, ..., $9n$ of a size that is equal at least to two DVB packets, the functions of which are:

to cancel the differences between the writing clocks which are recovered by the demodulators $7a$, $7b$, ..., $7n$ from the going-up signals, on the one hand, and, on the other hand, the reading clocks derivated from the satellite-borne clock Ho, shown at 11 and working into asynchronism with all earth clocks. The clock 11 drives all the satellite-borne assembly which begins by a multiplexer PMUX shown at 10;

to align the packets coming from the output of each of the SEDS blocks which are not necessarily in phase, at a level of the bits, the bytes, and the packet beginnings, taking into account the loss of interstation synchronisation.

The multiplexer PMUX 10 makes a cyclic reading of the buffers TAMP and, if these bluffers contain a full packet at the time of reading, the multiplexer PMUX 10 will transfer this packet to the great flow rate single output 12; otherwise, the multiplexer 10 will insert a special packet which is called a "dummy packet". In this operation, the multiplexer 10 is driven by the clock Ho.

A modified scrambler MEDS, shown at 13 and which is connected to the output of the multiplexer 10, operates on blocks of 204 bytes at the output 12 of the multiplexer. The modified scrambler MEDS 13 makes an exclusive-OR operation (XOR) between the packets of 204 bytes outputting from the multiplexer and pseudo-random sequences that are also of 204 bytes in length.

These pseudo-random sequences result from a cutting of the initial sequence of the EDS scrambler of the DVB-S into eight sections, the first of which has a length of 187 bytes and the seven other of which have a length of 188 bytes. A byte OxFF (255 in decimal) is added as header to the first sequence for making a sequence of 188 bytes. The value of the first byte of the seven other sequences are changed, bringing it to zero. Finally, the Reed Solomon code of the DVB is applied to the eight sequences of 188 bytes thus obtained, by producing thereby 8 pseudo-random sequences.

The result of this operation being determinative, it is possible to calculate, once for all, the sequences of the MEDS and store them in a read only memory (ROM).

The scrambling operation generated by the modified scrambler MEDS produces a flow of packets that is identical to that obtained with the original diagramm of the DVB-S in which the Reed Solomon encoding is applied to output or the DVB-S scrambler. Consequently, the output of the MEDS 13 may be directly connected to the convolutive interleaving block (EC) of the DVB diagramm, here shown at 14. The inner coding blocks (CI) and the quadriphase modulation block (QPSK), respectively shown at 15 and 16, are rigorously in accordance with the DVB-S specification. The formatting of the information which is thus made at output of the modulation block 16 is compatible with any receiver shown at 17 and designed for receiving a signal in accordance with DVB-S standard.

We claim:

1. A device for broadcasting digital information via a satellite from a plurality of earth stations each provided with clock means, comprising at least one set of links that send packet formatted digital information to the satellite on at least two different frequencies; at least one second set of links on board the satellite receiving said digital information packets; at least one packet time multiplexing module connected both to an output of said second set of links and to an input of a digital information formatting module having a broadcasting DVB-S chain beginning with a convolutive interleaving block and terminating with a QPSK modulator; and at least one clock on board the satellite working in asynchronism with each said clock means on said earth stations and driving a satellite-borne assembly which begins with the packet time multiplexing module;

wherein said first set of links does not include DVB-S scrambler means and wherein said digital information formatting module comprises a scrambler connected to the output of said packet time multiplex module and the input of the convolutive interleaving block.

2. A device as set forth in claim 1, wherein the signal transmitted via the satellite by means of the modulator and which is a time multiplex containing all the useful information, individually transmitted to the satellite by a plurality of earth stations is compatible with receivers designed for receiving DVB-S signals and in particular with home receivers that are currently spread over at a great scale, without modification thereof.

3. A device as set forth in claim 1, wherein the earth stations, sending their information flow to the multiplexing module, are free of clock mutual synchronisation mechanisms other than a derivation of broadcasting clocks from a clock extracted from the multiplex signal received on the going-down path.

4. A device as set forth in claim 1, wherein the earth stations comprise and structure including a source driven by an individual clock and connected to an encoding block, itself connected to a simplified scrambling block, output of said scrambling block being modulated by a modulator enabling said earth stations to activate and terminate transmission or to change of flow rates among values that are offered by the a satellite-borne receiving unit, without any impact on the service of other earth stations and without having recourse to a coordinating protocol between the stations, and therefore independently of a number of active earth stations and current flow rates thereof.

5. Device according to claim 4, wherein said simplified scramblers are means applying an exclusive OR operation of the DVB packets of 204 bytes with a pseudo-random sequence, the length of which is 203 bytes, the MPEG synchronization bytes of the packet not being scrambled.

6. A device as set forth in claim 1, wherein the earth stations comprise a Reed Solomon coding block of a DVB standard without making a Reed Solomon decoding on board the satellite, while ensuring a protection against transmission errors on going-up paths, and wherein the Reed Solomon decoding is made in earth receivers.

7. A device for broadcasting digital information via a satellite from a plurality of earth stations, comprising at least one set of links that send packet formatted digital information to the satellite on at least two different frequencies; at least one second set of links on board the satellite receiving said digital information packets; at least one packet time multiplexing module connected both to an output of said second set of links and to an input of a digital information formatting module comprising a broadcasting DVB-S chain beginning with a convolutive interleaving block and terminating with a QPSK modulator; and at least one clock on board the satellite working in asynchronism with clock means on each of said earth stations driving a satellite-borne assembly which begins with the packet time multiplexing module;

wherein said digital information formatting module includes a scrambler connected to the output of said packet time multiplex module and the input of said convolutive interleaving block;

wherein the scrambler is a modified scrambler ensuring on board the satellite a scrambling (EDS) of the DVB-S which takes into account that the packets outputting from the multiplexing module are encoded by a Reed Solomon coding of a DVB standard.

8. A device as set forth in claim 4, wherein the modified scrambler applies an exclusive-OR operation (XOR) between packets of 204 bytes outputting from the multiplexing module and pseudo-random sequences also of 204 bytes.

9. Device as set forth in claim 8, wherein said pseudo-random sequences result from a cutting of the initial sequence of the EDS scrambler of the DVB-S in eight sections, the first of which has a length of 187 bytes and the seven others of which have a length of 188 bytes, and by applying simple operations on these sequences.

10. A device as set forth in claim 9, wherein the simple operations applied on the sequences consist in cutting the initial sequence on the EDS scrambler of the DVB-S into eight sections, the first of which has a length of 187 bytes and the seven others of which have a length of 188 bytes; adding as header to the first sequence a byte OxFF (255 in decimal) for making a sequence of 188 bytes; changing the value of the first byte of the seven other sequences by bringing it to zero, and applying the Reed Solomton code of the DVB to the eight sequences of 188 bytes thus obtained, thereby producing 8 pseudo-random sequences.

11. A device as set forth in claim 9, wherein the pseudo-random sequences of the modified scrambler are pre-calculated and stored in a read only memory (ROM).

* * * * *